(12) United States Patent
Morrison et al.

(10) Patent No.: US 11,872,479 B2
(45) Date of Patent: Jan. 16, 2024

(54) ADAPTIVE JOYSTICK HAVING ROTARY DAMPERS

(71) Applicant: Dell Products L.P., Round Rock, TX (US)

(72) Inventors: Jason Scott Morrison, Chadron, NE (US); Erik Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 104 days.

(21) Appl. No.: 17/647,683

(22) Filed: Jan. 11, 2022

(65) Prior Publication Data
US 2023/0218986 A1 Jul. 13, 2023

(51) Int. Cl.
*A63F 13/24* (2014.01)

(52) U.S. Cl.
CPC .................................... *A63F 13/24* (2014.09)

(58) Field of Classification Search
None
See application file for complete search history.

(56) References Cited

U.S. PATENT DOCUMENTS

| 11,599,136 | B1* | 3/2023 | Morrison | G06F 3/016 |
| 2019/0286237 | A1* | 9/2019 | Eck | G06F 3/0338 |

\* cited by examiner

*Primary Examiner* — Peter J Iannuzzi
(74) *Attorney, Agent, or Firm* — Norton Rose Fulbright US LLP

(57) ABSTRACT

This disclosure describes systems, devices, apparatuses, and methods of adjusting a resistance of user-input device, such as a joystick. In particular configurations, the device includes a joystick configured to rotate about a first axis and a second axis and a first resistance mechanism coupled to the joystick. The first resistance mechanism can include a rotary damper configured to selectively resist rotation of the joystick about the first axis and a processor in communication with the rotary damper and configured to adjust a resistance torque of the rotary damper. The rotary damper may provide resistance through manipulation of a magnetorheological (MR) fluid in the fluid damper.

16 Claims, 11 Drawing Sheets

ADAPTIVE JOYSTICK HAVING ROTARY DAMPERS

FIELD OF THE DISCLOSURE

The instant disclosure relates to user input devices and systems. More specifically, portions of this disclosure relate to adaptive joysticks for computer devices or other gaming systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems. A user may interact with information handling systems through hardware components configured as user input devices and software configured to process input from the user input devices.

User input devices, including handheld videogame controllers, are used when operating various computer applications to enable users to provide input to operate various functions of the computer application. For example, a gaming controller can operate in conjunction with a gaming device to enable a user to provide input into an application, such as a video game, to control an object or character, select audio and/or video content, or otherwise control aspects related to the gaming device. Gaming controllers typically include multiple depressible buttons and one or more control sticks—which are able to be moved relative to a default position—that are controlled by a user to provide the input.

SUMMARY

According to embodiments of this disclosure, a gaming controller, or other user input device, may be provide variable (e.g., adjustable and/or adaptive) feedback. Some embodiments include a controllable resistance mechanism (e.g., rotary damper) that can be configured to selectively resist rotation of a control stick about an axis. Combinations of controllable resistance mechanisms can be included to provide independent control over a first and second axis. The resistance torque applied by the controllable resistance mechanisms can be adjusted based on a user input, adjusted based on an input from a computer application, dynamically based on events occurring in an application (such as feedback from events in a gaming application), or a combination of these and other feedback controls. Some user input devices can include a processor configured as a controller to adjust the resistance torque in real-time. Some user input devices can include an interface, wired and/or wireless, to receive commands to control the resistance torque in real-time, according to schedules, or on demand.

One configuration of the present disclosure includes a user input device having a joystick (e.g., shaft) configured to rotate about a first axis and a second axis and a first rotary damper coupled to the joystick that is configured to selectively resist rotation of the joystick about the first axis. In some configurations, the rotary damper includes a magnetorheological (MR) damper.

The first rotary damper may include or be coupled to a processor that is configured to adjust a resistance torque of the rotary damper. In some such configurations, the processor is configured to operate the rotary damper in a first state, in which the rotary damper exerts a first resistance torque on the joystick while the joystick rotates about the first axis and operate the rotary damper in a second state, in which the rotary damper exerts a second resistance torque on the joystick while the joystick rotates about the first axis. The second resistance torque can be greater than the first resistance torque. The processor may, for example, operate the rotary damper in the first state based on receiving a first input and operate the rotary damper in the second state based on receiving a second input. Additionally, or alternatively, the processor can be configured to determine a rotation angle of the joystick about the first axis. In some such configurations, the processor may select a resistance torque of the rotary damper based on the rotation angle. In some configurations, the rotary damper may be configured to (e.g., via the processor) to exert a first resistance torque on the joystick based the rotation angle being less than a resistance threshold and exert a second resistance torque on the joystick based the rotation angle being greater than the resistance threshold.

Some configurations of the user input device can include a housing defining a chamber that is configured to accommodate at least a portion of the joystick, a gear coupled to the joystick and configured to rotate with the joystick about the first axis. In some configurations the gear may be rotatably coupled to the housing. In some aspects, the rotary damper can include a gear sleeve that is configured to be coupled to (e.g., engage) the gear such that rotation of the joystick about the first axis rotates the gear sleeve. In some configurations, the processor is configured to determine a rotation angle of the joystick based on the rotation of the gear sleeve. In such configurations, based on the rotation angle being greater than a threshold, the processor is configured to operate the rotary damper in a third state. The third state can correspond to a state in which the rotary damper exerts a third resistance torque on the joystick while the joystick rotates about the first axis. Some configurations of the user input device can include a platform coupled to the joystick and defining an aperture. In some such configurations, the gear is configured to extend through the aperture to engage the gear sleeve.

In certain configurations, the user input device may include a spring configured to apply a biasing force to the joystick such that the joystick is biased towards a center position. In such configurations, the rotary damper is configured to apply a resistance torque to the joystick, the resistance torque being separate from the biasing force. Additionally, or alternatively, the user input device may include a second damper coupled to the joystick and configured to selectively resist rotation of the joystick about the second axis. The user input device may include a controller casing that defines a cavity and a printed circuit board (PCB) disposed within the cavity. In such configurations, the joystick, the rotary damper, and the second rotary damper can be coupled to the PCB and at least partially disposed within the cavity.

The processor (or a separate processor) may be in communication with the second damper. For example, the processor can be configured to operate the second rotary damper in a first state, in which the second rotary damper exerts a third resistance torque while the joystick rotates about the second axis and operate the second rotary damper in a second state, in which the second rotary exerts a fourth resistance torque while the joystick rotates about the second axis. The processor may be configured to operate the second rotary damper in a first state based on receiving a third input and operate the second rotary damper in a second state based on receiving a fourth input. In certain configurations, the processor operates the rotary damper and the second rotary damper independently.

Some configurations of the present disclosure include a joystick assembly having a joystick configured to rotate about a first axis and a second axis, a first magnetorheological (MR) damper configured to selectively resist rotation of the joystick about the first axis, and a second MR damper configured to selectively resist rotation of the joystick about the second axis. In some configurations, the joystick assembly can include a housing defining a chamber that is configured to accommodate a portion of the joystick. A first gear may be coupled to the housing and configured to rotate with the joystick about the first axis, a second gear may be coupled to the housing and configured to rotate with the joystick about the second axis, or both. In some aspects, the first gear is coupled to the first MR damper via a first gear sleeve and the second gear is coupled to the second MR damper via a second gear sleeve. Joystick assembly may include a processor in communication with the first MR damper to perform one or more operations. For example, the processor can be configured to receive a first input and, based on the first input, operate the first MR damper in a first state, in which the first MR damper applies a first resistance torque to the joystick.

Some configurations of the present disclosure may include a gaming system. The gaming system may include a gaming controller configured to transmit a plurality of signals (e.g., user input signals) to an external device. In some configurations, the gaming controller can include a joystick configured to rotate about a first axis and a second axis based on user input and a rotary damper configured to selectively resist rotation of the joystick about the first axis. The rotary damper may include a magnetorheological (MR) damper. The gaming controller may also include a processor configured to perform one or more operations with respect to the controller. As an example, the processor can be configured to receive a first input and, based on the first input, control the rotary damper to apply a first resistance torque. Additionally, or alternatively, the processor can be configured to receive a second input and, based on the second input, control the rotary damper to apply a second resistance torque. In some such configurations the second resistance torque is greater than the first resistance torque. The first input can be from an external source, such as the external device.

According to another configuration, a method may include manufacturing, constructing, operating, or otherwise using the configurations of the present disclosure, such as the described user input devices, joystick assemblies, gaming systems, or the like. In some aspects, the method can include receiving feedback instruction from an information handling system and operating the joystick based on the feedback instructions. In some configurations, the method can include controlling a resistance torque applied to a joystick as the joystick rotates about a first axis. Additionally, or alternatively, some methods can include controlling a resistance torque applied to a joystick as the joystick rotates about a second axis.

Another embodiment of the present disclosure includes receiving (such as over a wired, such as a USB cable, or wireless interface, such as Wi-Fi or Bluetooth connection), at a controller of a user input device, a feedback instruction from an information handling system. The feedback instruction may include separate first and second values for controlling feedback on two axis. A resistance mechanism on a first axis may be adjusted based on the first axis, and a resistance mechanism on a second axis may be adjusted based on the second axis.

The method may be embodied in a computer-readable medium as computer program code comprising instructions that cause a processor, such as a controller, to perform operations corresponding to the steps of the method. In some embodiments, the processor may be part of an information handling system including a first network adaptor configured to transmit and/or receive data over a first network connection; and a processor coupled to the first network adaptor, and the memory.

The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In any disclosed configuration, the terms "substantially" and "approximately" may be substituted with "within [a percentage] of" what is specified, where the percentage includes 0.1, 1, 5, and 10 percent.

The phrase "and/or" means "and" or "or." To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

User input devices with the adaptive joysticks to allow user and game driven customizations on two or more axes provide an improved user experience operating the user input device and interacting with an information handling system. For example, the adjustable resistance may allow more accurate input from the user by configuring the resistances for a particular application or scenario. As another example, the adjustable resistance may allow provide better feedback to the user when using the user input device and interacting with the information handling system. In a gaming application, resistances can be separately controlled on the two or more axes to more accurately simulate, for example, damage to an airplane aileron, elevator, rudder, etc., in a flight simulation.

Current control sticks for game controllers allow two-dimensional input by resiliently rotating along multiple axes about a center, default position. Input can then be provided based on the position of the control stick in relation to the default position. Conventional control sticks are biased relative to the default position so that a user must actively apply a force to the control stick to provide the input. Some video games require very precise movement of the control sticks, including holding a relative position for an extended period of time as well as quickly moving the control stick from opposing sides (e.g., down to up, left to right, etc.). Additionally, not all users have the same preferences for the movement of the control sticks, with some users preferring more sensitive movements and other preferring less-sensitive movements.

Shortcomings mentioned here are only representative and are included to highlight problems that the inventors have identified with respect to existing user input devices and interaction with information handling systems and sought to improve upon. Aspects of the devices and systems described below may address some or all of the shortcomings as well as others known in the art. Aspects of the devices and systems described below may present other benefits than, and be used in other applications than, those described herein.

Figure 1:
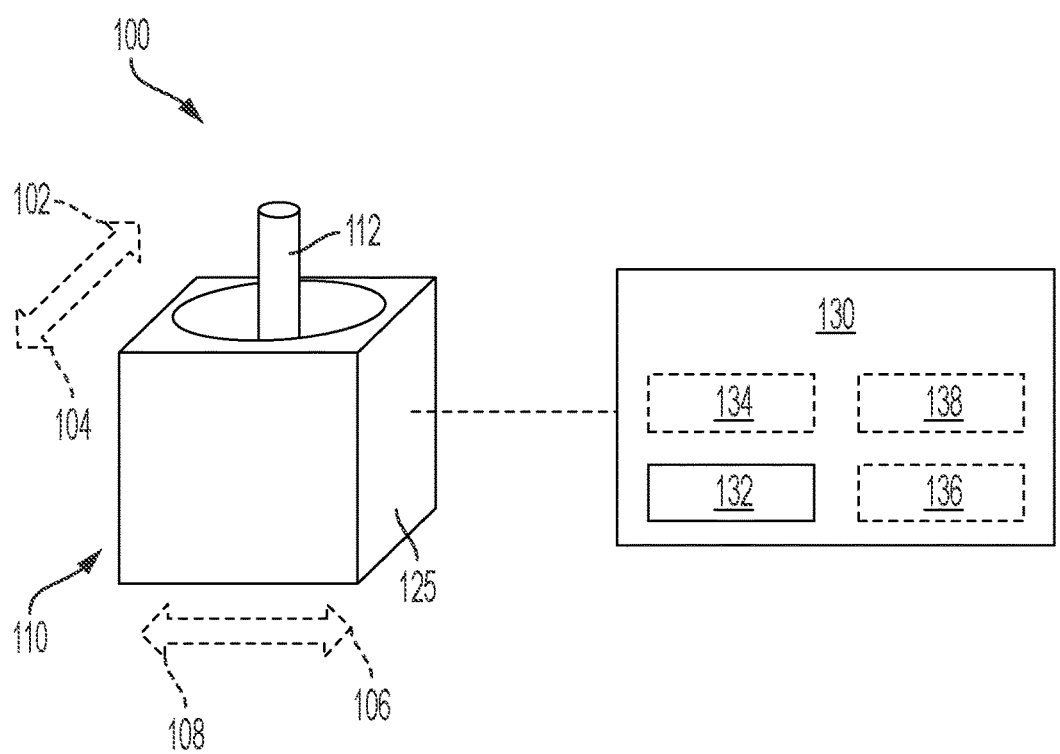
FIG. 1 is a schematic diagram of an example of a user input device according to one or more aspects of the present disclosure.
Figure 1:
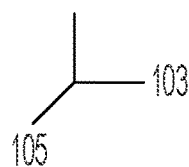

Referring now to FIG. 1, shown is an illustrative configuration of a user input device 100. Device 100 includes a joystick assembly 110 (e.g., control stick, analog stick, thumb stick, etc.) and a resistance mechanism 130 coupled to the joystick and configured to selectively resist movement of the joystick. In some configurations, device 100 can be, but need not be, in communication with an external device (e.g., 480).

As shown in FIG. 1, joystick assembly 110 includes a joystick 112 that is moveable, relative to at least one other portion of the joystick assembly, in at least four directions, such as, for example a first direction 102, a second direction 104 that is opposite the first direction, a third direction 106, and a fourth direction 108 that is opposite the third direction (collectively, "the directions"). In some configurations, joystick 112 is rotatable about a plurality of axes. As shown in FIG. 1, joystick 112 is rotatable about a first axis 103 (e.g., x-axis) and a second axis 105 (e.g., y-axis) to move in the directions. For example, in some configurations, joystick 112 may include a 2-axis gimbal that is rotatable about first axis 103 to move in first and second directions 102, 104 and rotatable about second axis 105 to move in third and fourth directions 106, 108. Joystick 112 may be biased toward a default position (e.g., center position) and return to the default position when a force is removed from the joystick. Although FIG. 1 depicts joystick 112 as being disposed with a housing 124, in other configurations the joystick can be coupled to a base or other portion of joystick assembly 110 while still achieving the functionality described herein. Additionally, or alternatively, joystick assembly 110 may include one or more additional components, such as a housing, a button, thumb cap, one or more sensors (e.g., positions sensors, magnetic sensors), circuitry, or the like, and can include components such as those found in a Stick Controller from ALPS®, various types of game controllers from Microsoft® Xbox® controllers developed by Microsoft Corporation of Redmond, Wash., United States, the PlayStation® DualShock® 3 and 4 controllers, developed by Sony Computer Entertainment, Inc., of Tokyo, Japan, or the like.

Device 100 includes one or more resistance mechanisms 130 coupled to joystick assembly 110 in such a manner as to resist rotation of joystick 112. As an illustrative example, resistance mechanism 130 may be coupled to joystick assembly 110 via gears, bands, or other power transmission system. Each resistance mechanism 130 may include a damper 132 (e.g., rotary damper), a processor 134, and, in some configurations, a memory 136. Each of damper 132, processor 134, and memory 136 can be in electrical communication with one another. In some configurations, resistance mechanism 130 includes, or is coupled to, a power source 138 (e.g., a battery, capacitors, a charge storage device, or the like) that is configured to provide electrical current to one or more components of the resistance mechanism.

Damper 132 is coupled to joystick assembly 110 and configured to provide resistance to joystick 112 as it moves in at least one of the directions. As an illustrative example, damper 132 may include a rotary damper that is configured to provide resistance as the joystick 112 rotates about first axis 103, second axis 105, or both. For example, damper 132 may be actuated from a non-energized state to an energized state to increase a resistance torque of the damper. In some configurations, damper 132 may be further adjusted in the energized state to further control (e.g., maintain, increase, or decrease) the resistance torque of the damper.

To further illustrate with respect to first axis 103, damper 132 may provide resistance in a clockwise rotation (e.g., as joystick 112 moves in first direction 102), counter clockwise rotation (e.g., as joystick 112 moves in second direction 104), or both. In some configurations, damper 132 includes a magnetorheological (MR) damper, also referred to as a MRF damper or MRF brake. In such configurations, MR damper (e.g., 132) includes magnetorheological (MR) fluid that is configured to change viscosity when subjected to a magnetic field. In this way, a resistance torque, or other damping characteristics, of MR damper (e.g., 132) may be controlled by varying a magnetic field intensity that is applied to the MR damper (e.g., via an electromagnet). In some such configurations, MR damper is coupled to a power source and an electrical current can be varied to control a resistance of the MR damper.

Processor 134 may be a central processing unit (CPU), microcontroller a field-programmable gate array (FPGA) device, an application-specific integrated circuits (ASIC), another hardware device, a firmware device, other computing circuitry or any combination thereof. Memory 136 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 136 may store data, such as joystick position data (e.g., a relative distance between an active position and the default position), resistance data, game configuration data (e.g., data or instructions from an external gaming device), or the like. Additionally, or alternatively, memory 136 may store one or more thresholds such as positional thresholds, rotation thresholds, resistance thresholds, or the like.

Memory 136 may also store instructions that, when executed by processor 134, cause the processor to perform one or more operations with the user input devices (e.g., 100), as described herein. For example, processor 134 may be configured to adjust a resistance that damper 132 applies to joystick 112 as the joystick moves away from the default position (e.g., in the first, second, third, or fourth directions). In a specific, non-illustrative configuration, processor 134 is configured to cause damper 132 to exert a first resistance torque while joystick 112 rotates about the first axis and exert a second resistance torque while the joystick rotates about the first axis, the second resistance torque being different (e.g., greater or less than) the first resistance torque. In some configurations, processor 134 may be configured to adjust a resistance of damper 132 based on an input signal, such as a signal from a user input, an external gaming device, or the like. For example, a user may select the resistance of damper based on the user's preference. As another example, an external gaming device may select the resistance based on a gaming event (e.g., increased resistance as a controllable character interacts with an obstacle). It should be understood that memory 136 may be configured to store other instructions, thresholds, or data sets that are not explicitly described herein.

User input device 100 is capable of being adjustable according to the preferences of a user, a gaming developer, or the like. Further, device 100 can provide additional feedback that cannot be performed by traditional input devices. Thus, device 100 may provide an enhanced user experience compared to traditional input devices. For example, device 100 may selectively resist rotation of a joystick (e.g., 112) about a first axis, a second axis, or both. In some such configurations, this resistance may be adjusted in real time based on a user input, an input from a computer application, or both, as further described herein.

Figure 2A:
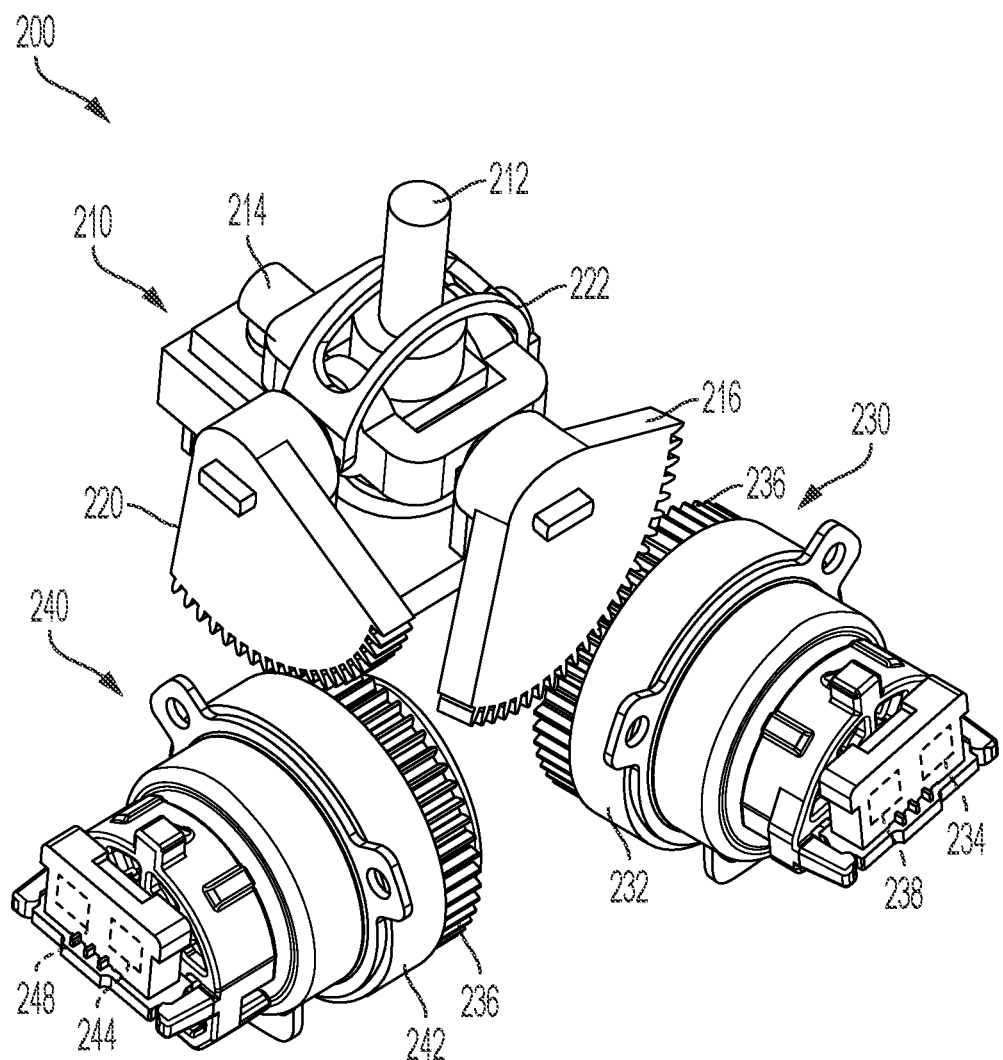
FIG. 2A is a perspective view of another example a user input device according to one or more aspects of the present disclosure.
Figure 2B:
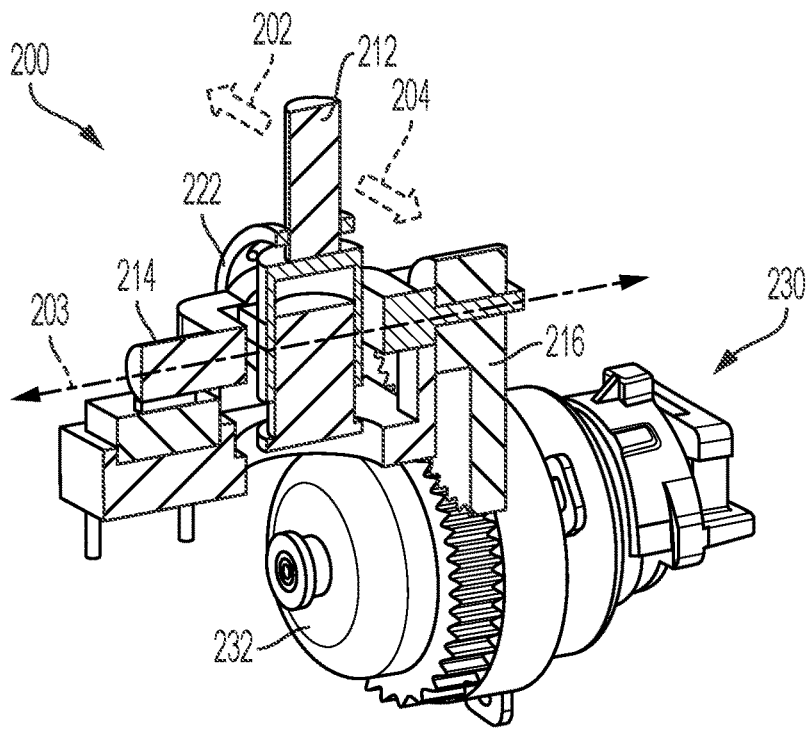
FIGS. 2B and 2C are perspective sectional views of the user input device of FIG. 2A taken about a first plane and a second plane, respectively.
Figure 2C:
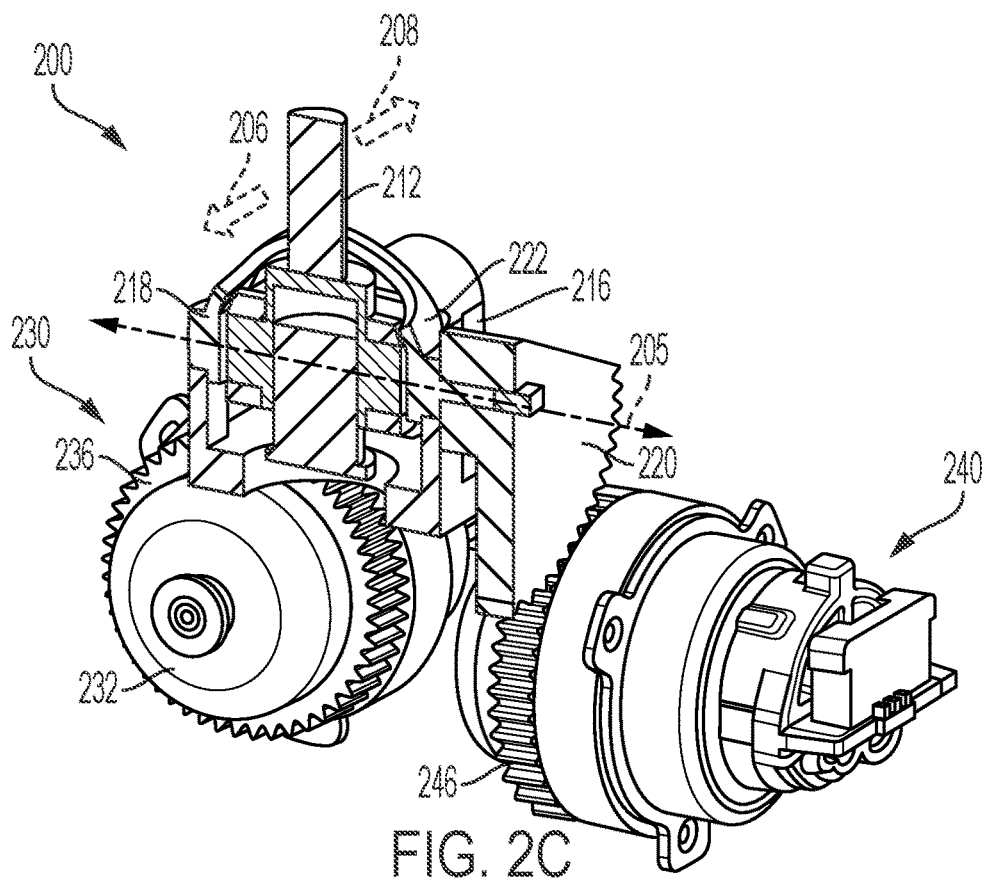

Referring to FIG. 2A-2C, views of an example of a user-input device 200 (device 200) are shown illustrating a manner of coupling two magnetorheological (MR) dampers to two axis of a joystick. For example, FIG. 2A shows a perspective view of an example of device 200; FIGS. 2B and 2C show perspective sectional views of device 200 taken about a plane that extends along a first axis 203 and a second axis 205, respectively. Device 200 includes a joystick assembly 210, a first resistance mechanism 230, and a second resistance mechanism 240. Device 200 and joystick assembly 210 may include or correspond to device 100 and joystick assembly 110, respectively. Additionally, or alternatively, first and second resistance mechanisms 230, 240 may include or correspond to resistance mechanism 130.

Joystick assembly 210 includes a joystick 212, a first stabilizer 214 coupled to a first gear 216, and a second stabilizer 218 coupled to a second gear 220. Joystick 212 may include or correspond to a shaft or protrusion that is configured to rotate about a first axis 203 and a second axis 205. In some configurations, first axis 203 is orthogonal to second axes 205. First stabilizer 214 is coupled to joystick 212 and configured to rotate with the joystick in at least one direction. To illustrate, as shown in FIG. 2B, first stabilizer 214 is configured to rotate with joystick 212 about first axis 203 when the joystick is moved in a first direction 202 and a second direction 204 that is opposite the first direction. Each of first and second directions 202, 204 may be orthogonal to first axis 203. In the depicted configuration, first gear 216 is fixedly coupled to an end of first stabilizer 214 and rotates with the first stabilizer about first axis 203. As shown, first gear 216 may define a slot that is configured to receive an end (e.g., protrusion) of first stabilizer 214. The first gear and the first stabilizer may be coupled in other suitable manners. Through this coupling, movement of joystick 212 in the first and second directions 202, 204 will cause first gear 216 to rotate about first axis 203. In some embodiments, the gear 216 includes a portion of a circumference of a circle. A partial circumference on the first gear 216 and other gears reduces the size of the joystick assembly by reducing a swept volume of the gears, and allowing a smaller form factor gaming controller.

Referring now to FIG. 2B, second stabilizer 218 is coupled to joystick 212 and configured to rotate with the joystick about second axis 205. Second gear 220 may be fixedly coupled or integral with second stabilizer 218 such that the second gear 220 and second stabilizer rotate with one another. As illustrated, second stabilizer 218 and second gear 220 are configured to rotate about second axis 205 as joystick 212 moves in a third direction 206 and fourth direction 208. In this way and others, movement of joystick 212 in the third and fourth directions 206, 208 (e.g., directions orthogonal to second axis 205) will cause second gear 220 to rotate about second axis 205. In some configurations, second stabilizer 218 may include a collar 222 that defines an elongated slot that extends along second axis 205. In such configurations, as joystick 212 moves along second axis 205 (e.g., in first and second directions 202, 204), the joystick does not engage collar 222. As joystick 212 rotates about second axis 205 (e.g., in third and fourth directions 206, 208), the joystick engages with collar 222 to rotate second stabilizer 218 about the second axis 205. Likewise, first stabilizer 214 may be structured such that rotation of joystick 212 about first axis 203 rotates the first stabilizer, but rotation of the joystick about second axis 205 does not rotate the first stabilizer.

As shown in FIGS. 2B and 2C, joystick assembly 210 may include or define a post or shaft that is configured to rotate from the default position. The post can include a single, unitary component or may include multiple components coupled together to form joystick 212. In some configurations, joystick 212 includes one or more biasing members, such as a compression spring, that is configured to bias the joystick to the default position. In some such configurations, the spring may be compressed when joystick 212 is rotated from the default position, and may thereby provide a resistance or centering tension that is felt by the user. In this way, the biasing member (e.g., spring) may actively apply a centering force to joystick 212 to move the joystick back to the default position. In some configurations, the biasing member can be adjusted to increase or decrease the centering tension that acts on joystick 212. For example, in configurations in which the biasing member includes the spring, a compression of the spring may be increased to provide a greater centering tension.

Referring again to FIG. 2A, first resistance mechanism 230 includes a rotary damper 232, a processor 234 (e.g., controller), a gear sleeve 236, and one or more sensors 238. Damper 232 may include or correspond to damper 132 and processor 234 may include or correspond to processor 134, memory 136, or both. In the depicted configuration, damper 232 is a magnetorheological (MR) damper having a housing configured to be filled with magnetorheological (MR) fluid. Gear sleeve 236 (e.g., ring gear) is fixedly coupled to or integral with damper 232. In the depicted configurations, gear sleeve 236 surrounds damper 232 and includes a plurality of gear teeth. Gear sleeve 236 is configured to engage with first gear 216 such that rotation of the first gear applies a rotational force to damper 232 in a clockwise or counter-clockwise manner, as described further herein at least with reference to FIGS. 3C and 3D. Sensor 238 is configured to determine a rotational position of damper 232, first gear 216, joystick 212, or combination thereof. As an example, sensor 238 is configured to determine a rotational position of damper 232 relative to a default position. In some such configurations, processor 234 may then determine positional information of first gear 216 and joystick 212 based on the rotational position of damper 232. In other configurations, sensor 238 can detect positional information of damper 232, first gear 216, and joystick 212.

Processor 234 is configured to control a resistance of damper 232. In some configurations, damper 232 may be configured to be electrically coupled to a power source (e.g., 138, 470) and processor 234 is configured to control the power source to adjust a resistance of the damper. In some configurations, damper 232 may include an electromagnet (not shown) that is configured to generate a magnetic field based on an electric current received from the power source. In such configurations, processor 234 is configured to vary the electric current to control an intensity of the magnetic field, and thereby the resistance of the MR damper. By adjusting a resistance (e.g., resistance torque) of damper 232, processor 234 may adjust a resistance of joystick 212 as a user moves the joystick in the first direction 202, second direction 204, or both. For example, processor 234 may control (e.g., increase or decrease) a resistance of damper 232 based on the direction of rotation (e.g., counter-clockwise) such that a resistance is applied to joystick 212 only when the joystick moves in a certain direction (e.g., first direction 202). In a specific, non-limiting example, processor 234 can increase a magnitude of a magnetic field applied to the MR damper from a first intensity to a second intensity based on a movement of joystick 212 in a first direction and decrease the intensity of the magnetic field (e.g., to the first intensity, turn off magnetic field, or the like) based on movement of the joystick in a second direction. In another example, processor 234 may adjust a resistance of joystick based on positional information of damper 232, first gear 216, or joystick 212.

In some configurations, second resistance mechanism 240 includes a MR rotary damper 242, a processor 244 (e.g., controller), a gear sleeve 246, and one or more sensors 248. Second resistance mechanism 240 may be substantially similar to first resistance mechanism 230 except that gear sleeve 246 is configured to engage with second gear 220 such that rotation of the second gear rotates damper 242. Processor 244 is configured to adjust a resistance (e.g., resistance torque) of damper 242 to control the resistance of joystick 212 as a user moves the joystick in the third and fourth directions 206, 208. Processor 234, 244 may independently adjust the resistance of dampers 232, 242, respectively. For example, processor 234 may set the resistance of damper 232 at a first resistance torque and processor 244 may set the resistance of damper 242 at a second resistance torque. Although described as using separate processors 234, 244 for each resistance mechanism 230, 240, in other configurations, the resistance mechanisms may be in communication with the same processor that is configured to operate both resistance mechanisms, independently.

As described herein, device 200 may be configured to adjust a joystick resistance in any of three hundred and sixty (360) degrees. Each of first and second resistance mechanisms 230, 240 may be configured to apply a passive resistance force to joystick 212, as compared to the active centering force applied by a biasing member (e.g., via a spring). Such configurations allow for a selective resistance force (e.g., selected by a user, a gaming developer, or the like) that can be adjusted based on multiple factors to enable a more immersive and controllable gaming experience.

Figure 3A:
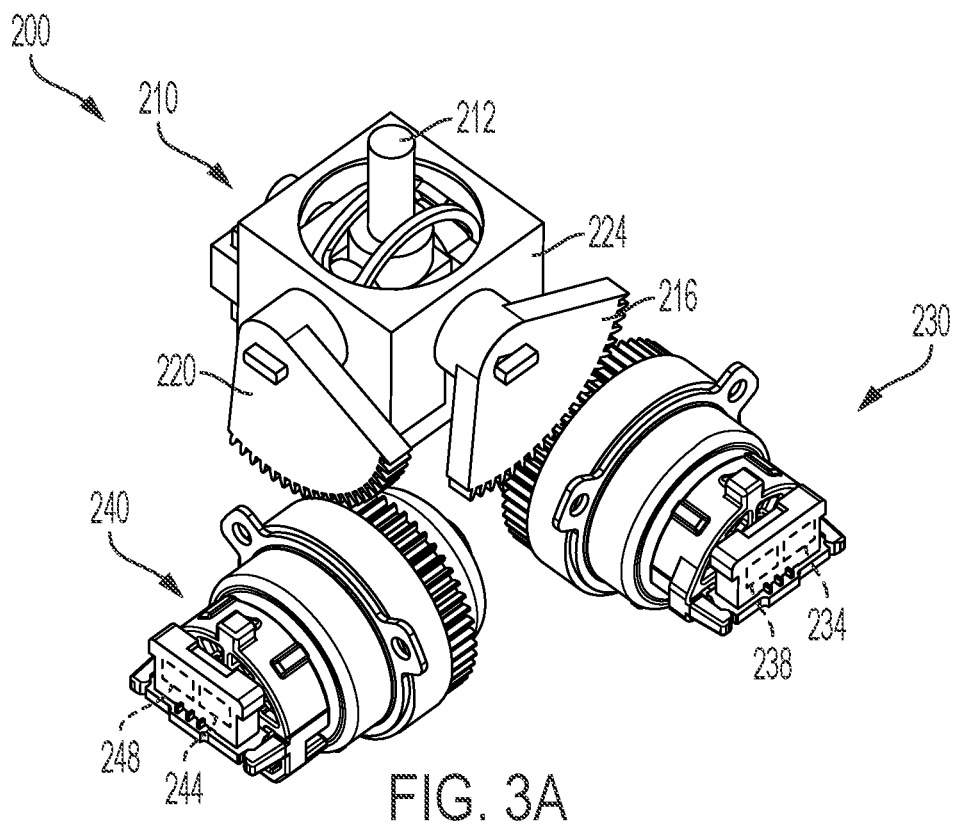
FIG. 3A is a perspective view of another example a user input device according to one or more aspects of the present disclosure.
Figure 3B:
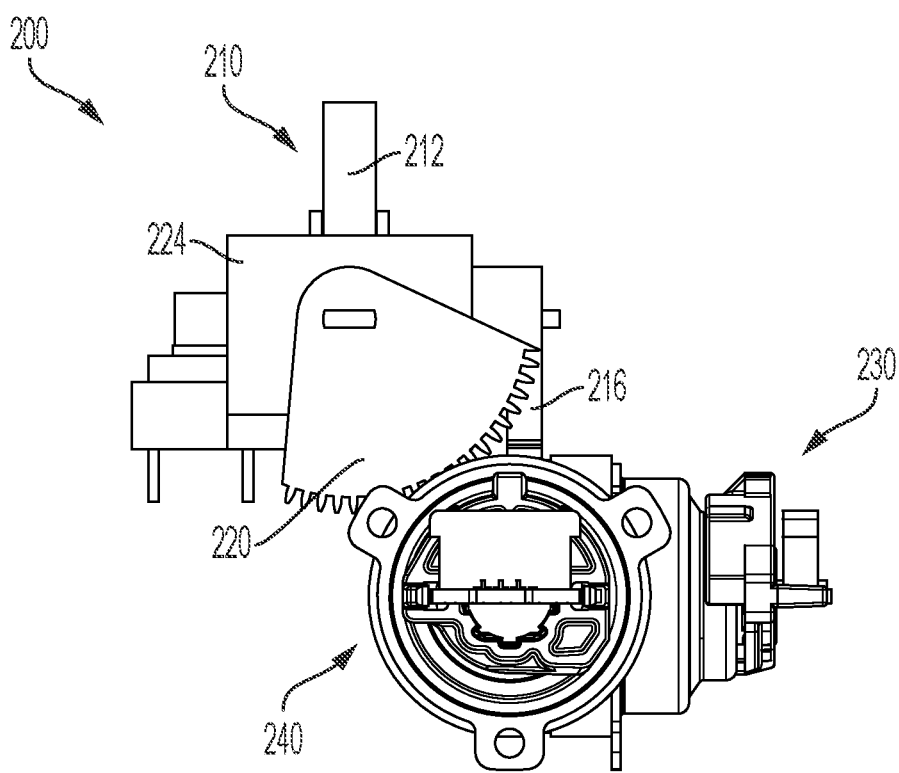
FIG. 3B is a side view of the user input device of FIG. 3A.
Figure 3C:
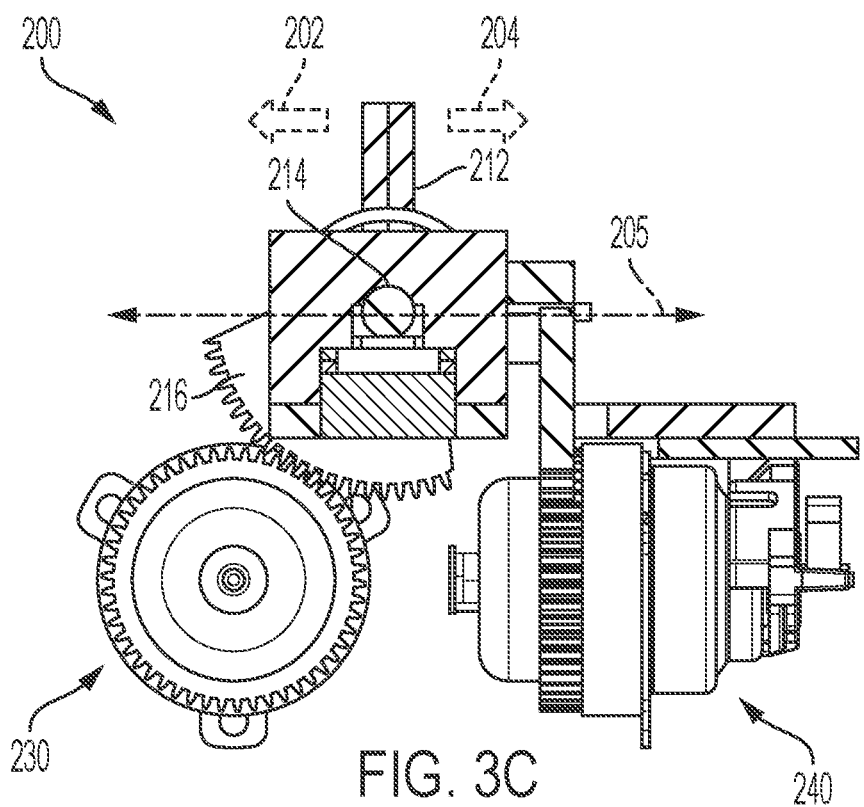
FIGS. 3C and 3D are side views of the user input device of FIG. 3A in a first position and a second position, respectively.
Figure 3D:
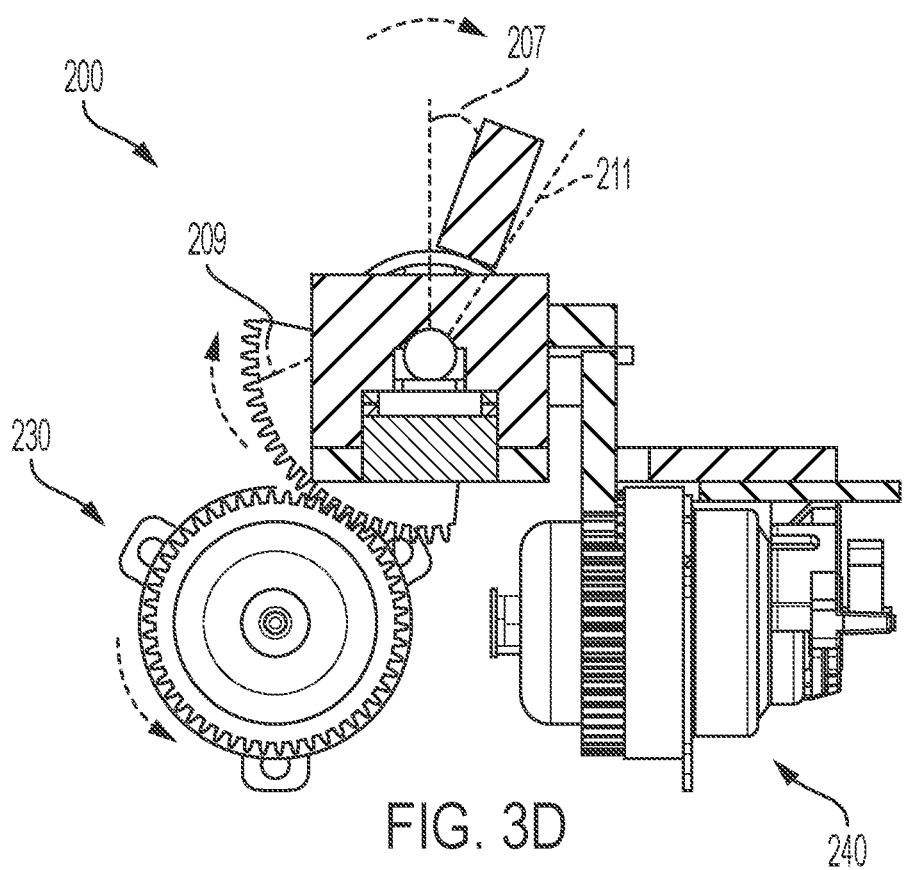

Referring to FIG. 3A-3D, views of another example of user-input device 200 are shown. For example, FIG. 3A shows a perspective view of an example of device 200 that includes a housing 224 configured to cover a portion of joystick 212; FIG. 3B shows a first side view of device 200; and FIGS. 3C and 3D show second side views of device 200 in a first, default position and a second position, respectively.

As shown in FIG. 3A, housing 224 can define a chamber configured to accommodate at least a portion of joystick 212. For example, a first end of joystick 212 may be disposed within housing 224 and a second end of the joystick may extend outside of the housing to be manipulated by a user. In the depicted configuration, at least a portion of first stabilizer 214, second stabilizer 218, and joystick 212 are disposed within housing 224 and are moveable relative the housing. As shown, first gear 216 and second gear 218 are pivotably coupled to an exterior of housing 224 and configured to rotate relative to the housing. For example, first and second stabilizers 214, 218 can extend through housing 224 (e.g., via an aperture) to couple first and second gears 216, 220, respectively, to the housing.

Referring now to FIGS. 3C and 3D, device 200 is shown in a first position (FIG. 3C) in which joystick 212 is in a central, default position and a second position (FIG. 3D) in which the joystick is rotated about first axis (e.g., 203). As shown in FIG. 3C, while the joystick 212 is in the default position, first gear 216 and first resistance mechanism 230 are in default positions. Additionally, or alternatively, while the joystick 212 is in the default position, second gear 220 and second resistance mechanism 240 are in default positions. In some configurations, the default positions of the gears 216, 220 and the resistance mechanisms 230, 240 correspond to a fixed physical position of the respective components, while in other configurations the default position can be selected (e.g., via processor 234, 244, or both). In some configurations, joystick 212 is centered relative to first axis 203 and second axis 205 in the default position. For example, a center line of joystick 212 may intersect first and second axes 203, 205 at a single point (e.g., a center of housing 224).

As joystick 212 is moved in second direction 204 (e.g., rotated about first axis 203) toward the second position (FIG. 3D), first gear 216 and first resistance mechanism 230 are rotated relative to their default positions. For example, when joystick 212 is rotated from the default position by a first angle 207, the first gear 216 and first resistance mechanism 230 are rotated by a corresponding angle 209. As shown in FIG. 3D, angle 209 is equal to first angle 207; however, in other configurations angle 209 can be different from first angle 207 depending on the gear ratio (e.g., size of first gear 216, gear sleeve 236). In some configurations, processor 234 is configured to determine the rotation angle (e.g., 207) of joystick 212 based on the rotation of first gear 216 or first resistance mechanism 230. For example, sensor 238 may determine a first rotation angle (e.g., 209) of first resistance mechanism 230 and transmit the first rotation angle to processor 234 to calculate the rotation angle (e.g., 207) of joystick 212.

In some configurations, processor 234 is configured to set a resistance of damper 232 based on the rotation angle (e.g., 207) of joystick 212. To further illustrate, processor 234 may store a rotation threshold, illustrated as line 211, and compare the rotation angle (e.g., 207) of joystick 212 to the rotation threshold. In some configurations, rotation threshold 211 corresponds to a selected or pre-determined rotation angle of joystick 212. Processor 234 may adjust the resistance of damper 232 based on joystick 212 exceeding the rotation threshold 211. For example, first resistance mechanism 230 (e.g., processor 234) may be configured to exert a first resistance torque on joystick 212 (e.g., via first gear 216 and first stabilizer 214) based the rotation angle (e.g., 207) being less than rotation threshold 211 and exert a second resistance torque on the joystick based the rotation angle being greater than the rotation threshold. First resistance mechanism 230 may similarly adjust a resistance torque applied to joystick 212 as the joystick moves in first direction 202, except that first gear 216 rotates in an opposite direction. Although operation of first resistance mechanism 230 is described above with respect to rotation of joystick 212 about first axis 203, it should be understood that the second resistance mechanism 240 would operate similarly as the joystick rotates about second axis 205 (e.g., in the third and fourth directions 206, 208).

Figure 4A:
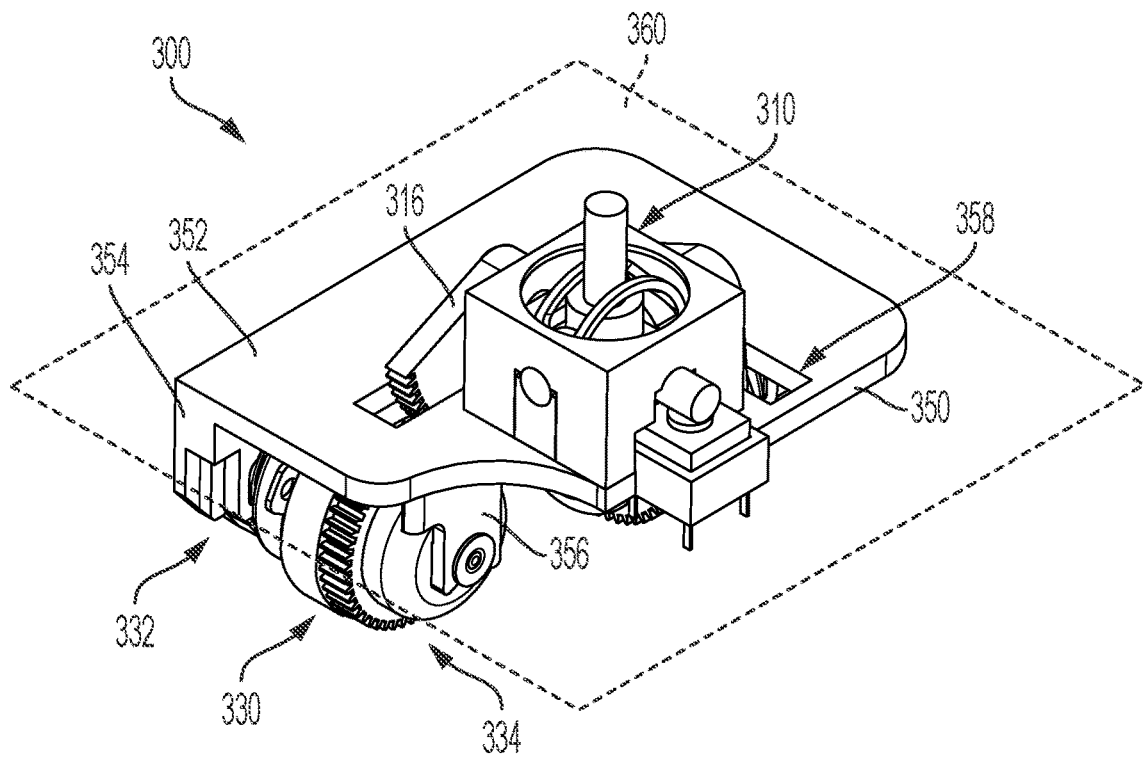
FIG. 4A is a perspective view of another example a user input device according to one or more aspects of the present disclosure.
Figure 4B:
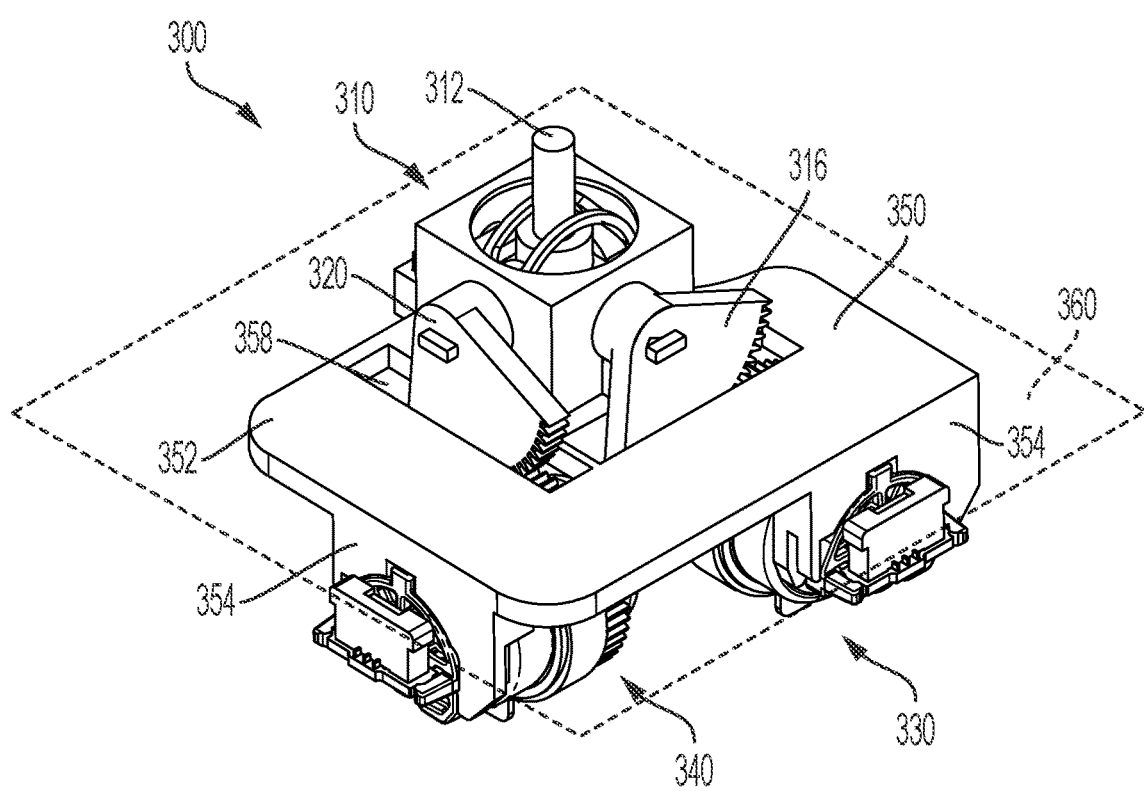
FIGS. 4B and 4C are various perspective views of the user input device of FIG. 4A.
Figure 4C:
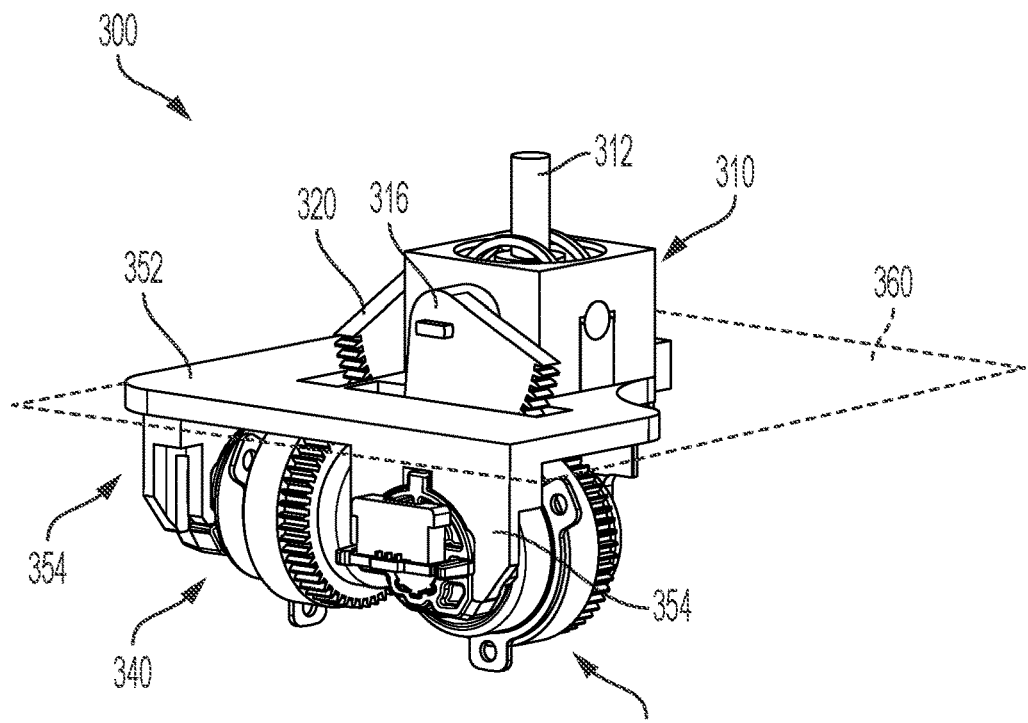
Figure 4D:
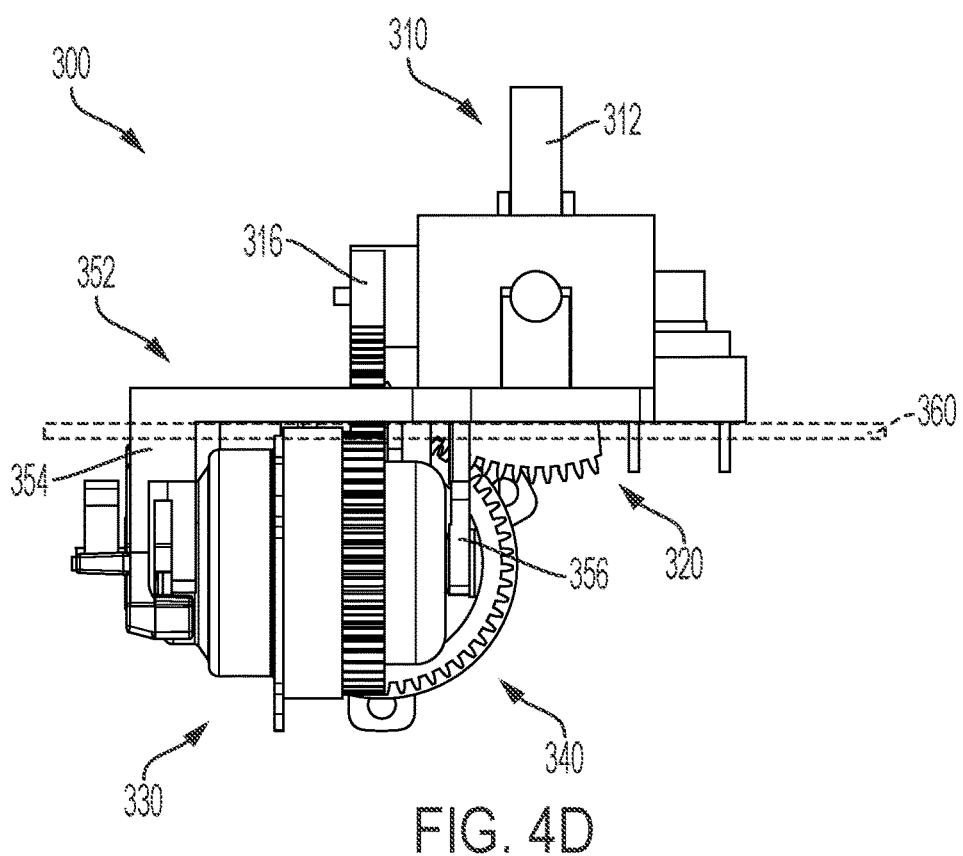
FIGS. 4D and 4E are various side views of the user input device of FIG. 4A.
Figure 4E:
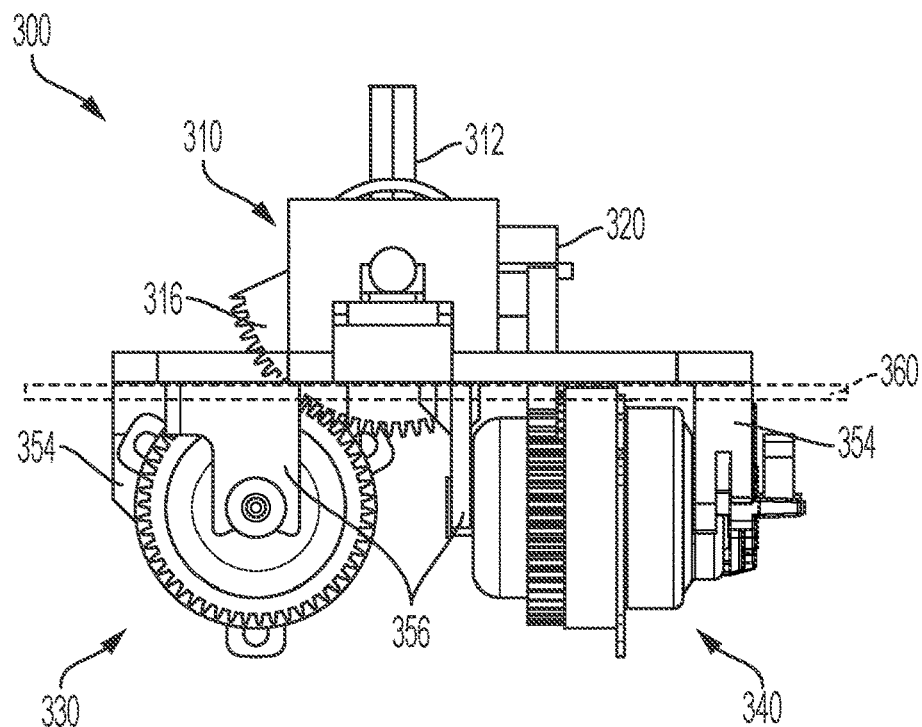
Figure 4F:
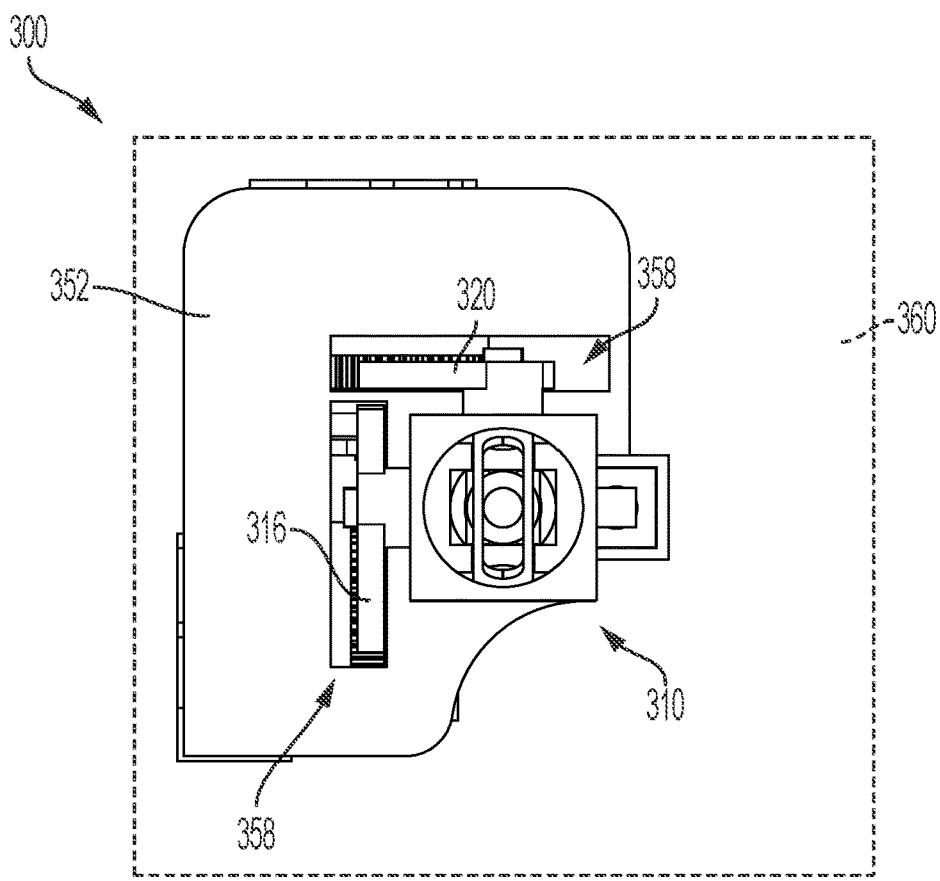
FIG. 4F is a top view of the user input device of FIG. 4A.

Referring to FIG. 4A-4F, views of another example of user-input device 300 are shown. For example, FIG. 4A shows a first perspective view of an example of device 300; FIG. 4B shows a second perspective view of device 300; FIG. 4C shows a third perspective view of device 300; FIG. 4D shows a first side view of device 300; and FIG. 4E shows a second side view of device 300; and FIG. 4F shows a top view of device 300.

Device 300 includes a joystick assembly 310, a first resistance mechanism 330, a second resistance mechanism 340, and a platform 350 coupled to the joystick assembly and the first and second resistance mechanisms. Device 300 and joystick assembly 310 may include or correspond to device 200, 100 and joystick assembly 210, 110, respectively. Joystick assembly 310 includes a joystick 312, a first gear 316 coupled to first resistance mechanism 330, and a second gear 320 coupled to second resistance mechanism 340. In some configurations, first and second resistance mechanisms 330, 340 may include or correspond to first and second resistance mechanisms 230, 240, respectively.

Platform 350 includes a first portion 352 (e.g., base 352) coupled to joystick assembly 310 and one or more second portion 354 (e.g., sidewalls 354) coupled to first resistance mechanism 330, second resistance mechanism 340, or both. In some configurations, base 352 may include or define a base of joystick assembly 310. In some configurations, such as that shown in FIG. 4E, platform 350 can include one or more third portions 356 (e.g., supports 356) coupled to first resistance mechanism 330, second resistance mechanism 340, or both. Sidewalls 354 and supports 356 rotatably support first and second resistance mechanisms 330, 340. In the depicted configurations, sidewalls 354 and supports 356 may be coupled to opposing ends of resistance mechanisms 330, 340 such that one of the resistance mechanisms is at least partially interposed between a respective one of the second and supports. As an illustrative example, sidewall 354 may be coupled to an exterior portion 332 of first resistance mechanism 330 and support 356 may be coupled to an interior portion 334 of first resistance mechanism 330. In some configurations, sidewall 354 may, but need not, extend from a periphery of base 352. Additionally, or alternatively, supports 356 may extend from an interior of base 352. In the depicted configurations, sidewalls 354 and supports 356 extend away from a bottom surface of base 352 and are substantially orthogonal to the base.

Base 352 may be coupled to a printed circuit board (PCB) 360 or other hardware. Although not shown, additional electronic components (e.g., power source, processors, memory storage, transistors, resistors, graphics cards, integrated circuits, or other circuitry or hardware) may be coupled to PCB 360 and can be electrically connected to device 300 via the PCB. As shown in FIGS. 4A and 4B, base 352 defines one or more apertures 358 (e.g., slots). Apertures 358 may be sized to receive first and second gears 316, 320. As an illustrative example, joystick assembly 310 is disposed on a first side of base 352 and first and second resistance mechanism 330, 340 are disposed on a second side of the base. In some such configurations, first gear 316 extends through an aperture (e.g., 358) to couple joystick assembly 310 to first resistance mechanism 330. Additionally, or alternatively, second gear 320 can extend through one other aperture (e.g., 358) to couple joystick assembly 310 to second resistance mechanism 340. Apertures 358 are sized to enable first and second gears 314, 316 to rotate relative to platform 350 without interference. In some configurations, PCB 360 defines one or more openings that are configured to be aligned with apertures 358 such that while device 300 is coupled to the PCB, the first and second gears 316, 320 extend through both base 352 and the PCB. Additionally, or alternatively, PCB may define one or more openings that are configured to accommodate sidewalls 354, supports 356, or other components of device 300 such that the device may operate as described herein.

Figure 5A:
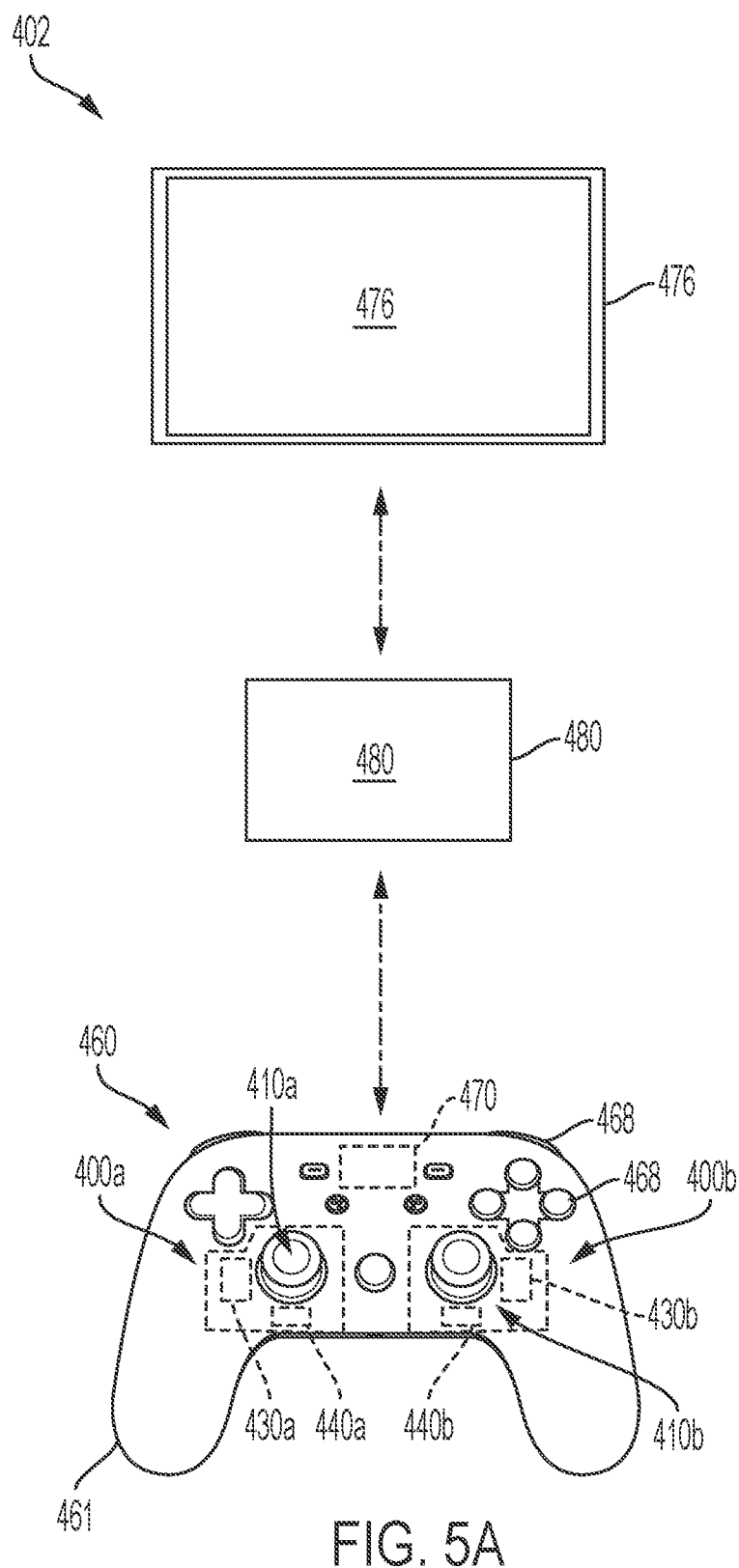
FIG. 5A is a schematic diagram of an example of a system that includes a user input device according to one or more aspects of the present disclosure.
Figure 5B:
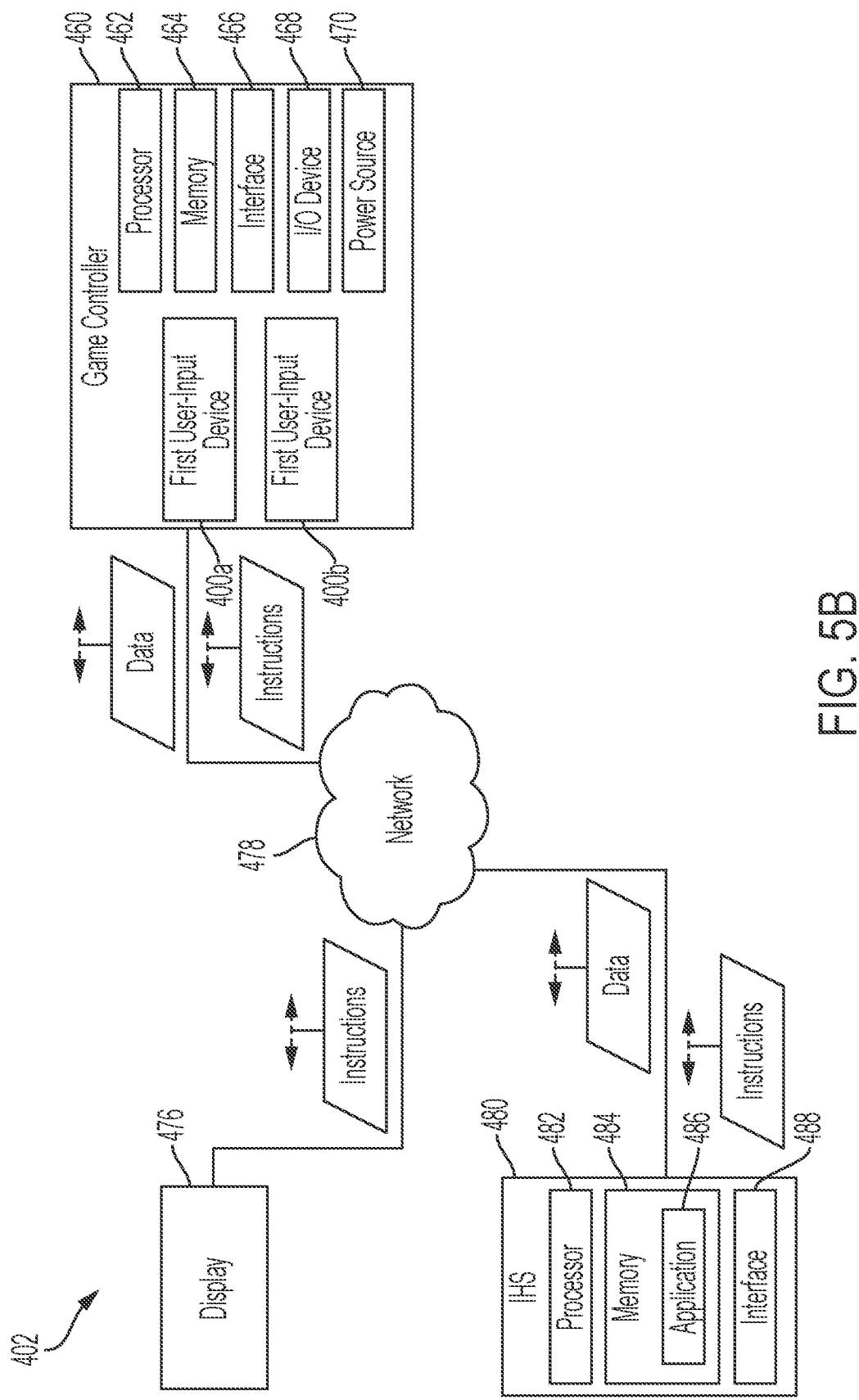
FIG. 5B is a block diagram of an example of the system of FIG. 5A

Referring now to FIGS. 5A and 5B, a system 402 for receiving user input and/or providing feedback through a user-input device (e.g., 400a, 400b) is shown. System 402 includes one or more controllers 460, a display 476, and one or more information handling systems (IHS) 480 (e.g., video game console, entertainment console, personal computer, or other multimedia device) configured to execute one or more applications (e.g., video games). In some embodiments, the IHS 480 executing applications may be integrated with the display 476. In some configurations, display 476 and IHS 480 can be integrated with controller 460 as part of a mobile computing system or other information handling system such that the applications are executed at the controller 460.

Controller 460 is in communication with IHS 480 (e.g., wired or wireless communication) and is configured to send and receive signals (e.g., user input signal) with the external device to navigate or otherwise control the applications. For example, as shown in FIG. 5A, controller 460 is a video game controller, IHS 480 is a gaming console, and display 476 is a television. In some such configurations, the various devices of system 402 (e.g., controller 460, IHS 480, and display 476) may be communicatively coupled to each other via one or more networks 478 (e.g., a Bluetooth personal area network (PAN), an Ethernet local area network (LAN), a wireless local area network, a wide area network (WAN) or other network).

Controller 460 can include a controller casing 461 (e.g., shell) that defines an interior cavity that is configured to at least partially accommodate a first user-input device 400a, a second user-input device 400b, a third user-input device 468, or more. First device 400a and second device 400b may include or correspond to an embodiment of device 100, 200, 300. For example, first device 400a may include a joystick assembly 410a coupled to a first resistance mechanism 430a and a second resistance mechanism 440a. A second device 400b includes a joystick assembly 410b coupled to a first resistance mechanism 430b and a second resistance mechanism 440b. Joystick assembly 410a and 410b extend from controller casing 461 and are configured to manipulate by a user. A user may operate (e.g., rotate) the first and second device 400a, 400b, as described herein, to provide input to an application executing on the IHS 480.

As shown in FIG. 5B, controller 460 may include processor 462, a memory 464, an interface 466, an input/output (I/O) device 468, a power source 470, or combination thereof. The controller 460 in FIGS. 5A and 5B may not include all of the components shown and/or may include additional components. Processor 462 may be a central processing unit (CPU) or other computing circuitry (e.g., a microcontroller, one or more application specific integrated circuits (ASICs), or the like) and may have one or more processing cores. Memory 464 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 464 may store instructions that, when executed by processor 462, cause processor 462 to perform the operations in connection with controller 460. Additionally, memory 464 may store one or more thresholds, data, preferences, or other settings. For example, memory 464 may store one or more rotational thresholds (e.g., 211) of first device 400a, second device 400b, or both.

Interfaces 466, such as wireless interfaces, may be configured to enable wireless communication between controller 460 and external device 480, display 476, or both. In some implementations, wireless interfaces 466 include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, another type of network interface, or the like. I/O device 468 includes one or more switches (e.g., depressible buttons, triggers, or the like), one or more touchscreens, a microphone, a camera, one or more speakers, one or more light sources, vibration devices, or other types of devices that enable a user to receive information from or provide information to controller 460.

IHS 480 is configured to support and operate one or more electronic applications (e.g., 486), such as a video game, video streaming platform, music streaming platform, or other media platform. IHS 480 is referred to broadly and includes any suitable processor-based device such as, for example, video game console, a hand-held console, a desktop computer, a laptop computer, or a mobile computing device a tablet, a digital media or entertainment device, or another type of electronic device. IHS 480 may include at least a processor 482, a memory 484, and an interface 488 to enable communication with controller 460, and optionally with display 476. Processor 482 may be configured to execute instructions stored at memory 484 to cause IHS 480 to perform the operations described herein. In some implementations, IHS 480 can be configured to access a wireless network or the Internet (e.g., via an application on IHS 480) or to access a web application or web service hosted by a server, and thereby provide a user interface for enabling a user to access an application 486. In some configurations, IHS 480 is configured to act as an intermediary between controller 460 and display 476. For example, IHS 480 may receive a user input from controller 460 (e.g., at device 400a) and transmit and/or process the user input to display 476 to change the displayed environment (e.g., navigation between icons, rotating a point of view of a character, select a visual prompt, or otherwise changing the display environment). In some configurations, IHS 480 is configured to send instructions (e.g., signals) to controller 460 to transmit information to the user. For example, based on a programmable setting of application 486, IHS 480 may transmit one or more instructions to cause device 400a, device 400b, or both, to adjust a resistance of the resistance mechanisms (e.g., 430a, 430b, 440a, 440b). In some configurations, a user may transmit (e.g., via controller 460) a target resistance to IHS 480, which can then transmit one or more signals to controller 460 to adjust a resistance of one or more of the resistance mechanisms (e.g., 430*a*, 430*b*, 440*a*, 440*b*) to the target resistance. In some such configurations, the target resistance may be selected locally, for a single application (e.g., 486), or globally, for all applications (e.g., 486).

Additionally, or alternatively, application 486 may cause IHS 480 to transmit instructions to controller 460 to cause device 400*a*, device 400*b*, or both, to adjust a resistance of the resistance mechanisms (e.g., 430*a*, 430*b*, 440*a*, 440*b*). In an illustrative example, application 486 may allow a user to control a character in a gaming environment. When the character interacts with an obstacle (e.g., a wall), IHS 480 and application 486 can determine the movement of the character is hindered. Based on this determination, IHS 480 can transmit an adjust resistance signal to device 400*a*—which controls character movement—and the device 400*a* may adjust a resistance of a rotary damper (e.g., 132, 232, 242) accordingly. In this way, the user may be informed (e.g., via increased resistance of the joystick) of the obstacle in a manner that is not possible with conventional controllers. The adjust resistance signal may also include information associated with a rotation direction of a joystick, a resistance intensity (e.g., resistance torque), or both. To illustrate, a first adjust resistance signal may be associated with a first direction (e.g., 102, 202) and a high intensity. Based on receiving the first adjust resistance signal, device 400*a* may set the resistance of first resistance mechanism 430*a* to a target resistance associated with the high intensity for a rotational direction (e.g., clockwise) associated with the first direction (e.g., 102, 202). In this way and others, system 402 and devices 400*a*, 400*b*, may enable application developers to include a more immersive experience by providing additional feedback to the users.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 6:
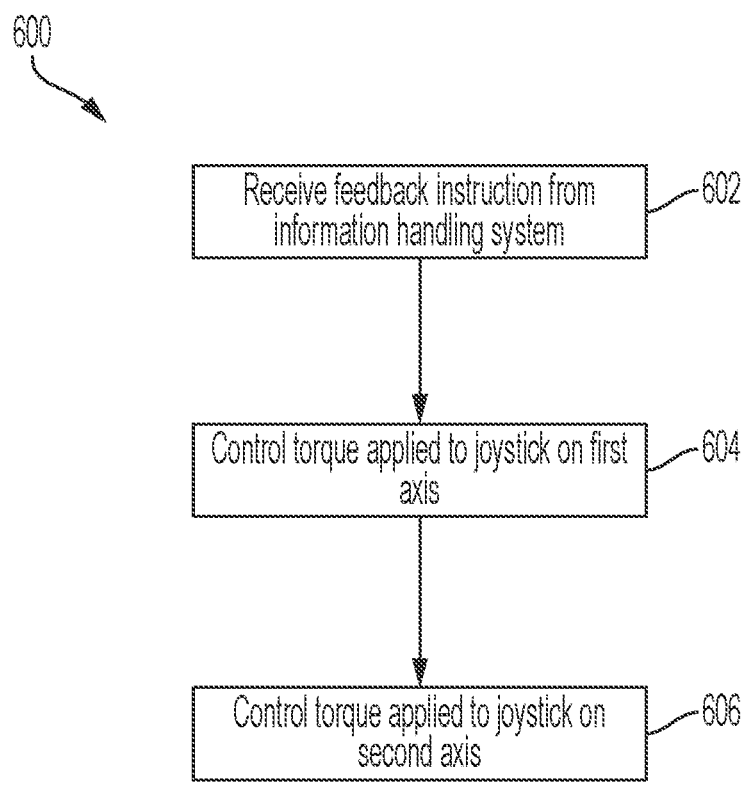
FIG. 6 illustrates a flow diagram of an example of a method of operating a user input device according to one or more aspects of the present disclosure.

Referring to FIG. 6, a method 600 of operating a user input device, such as device 100, 200, 300, 400*a*, 400*b*, or the like, is shown. Method 600 may be performed at, by, or with device 100, 200, 300, 400*a*, 400*b*, or one or more components thereof. Method 600 includes receiving feedback instruction from an information handling system, at 602. The information handling system can include or correspond to a processor configured as a controller (e.g., processor 134, 234, 244, 462, 482, or the like), a memory configured to store one or more instructions that are executed by the processor (e.g., memory 136, 464, 484, or the like). The feedback instruction may include separate first and second values for controlling a resistance of a joystick about a first and second axis, respectively. The first and second values can include or correspond to joystick position data (e.g., a relative distance between an active position and the default position), resistance data, game configuration data (e.g., data or instructions from an external gaming device), one or more thresholds such as positional thresholds, rotation thresholds, resistance thresholds, or combination thereof.

Method 600 further includes controlling a resistance torque applied to a joystick (e.g., joystick 112, 212, 310, 410*a*, 410*b*) as the joystick rotates about a first axis (e.g., 103), at 604. To illustrate, a damper (e.g., 132, 232, 242, 330, 340), such as a MR damper, may control the resistance torque applied to the joystick, as described above. For example, the damper may maintain or adjust the resistance torque based on a user input, an input from a computer application, dynamically based on events occurring in an application (such as feedback from events in a gaming application), or a combination thereof. In some configurations, the damper may control the resistance torque based on joystick position data (e.g., a relative distance between an active position and the default position), resistance data, game configuration data, or the like. As a non-limiting example, a processor can receive an input associated with a target resistance and control the damper to operate at a target resistance torque that is linked to the target resistance. In a specific configuration, processor may control an electrical current supplied to the damper (e.g., to an electromagnet) to control the damper to operate at the target resistance torque.

In some configurations, method 600 can include a step of controlling a resistance torque applied to the joystick (e.g., joystick 112, 212, 310, 410*a*, 410*b*) as the joystick rotates about a second axis (e.g., 105), at 606. To illustrate, a damper (e.g., 132, 232, 242, 330, 340), such as a MR damper, may control the resistance torque applied to the joystick, as described above. The damper controlling resistance about the first axis may be separate from the damper that controls the resistance about the second axis. In such configurations, these separate dampers can be controlled independently of one another.

Method 600 may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), or other optical disk storage, magnetic disk storage or other magnetic storage devices, or any other medium that can be used to store desired program code in the form of instructions or data structures and that can be accessed by a computer. Combinations of the above should also be included within the scope of computer-readable media. In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The invention claimed is:

1. A user input device, comprising:
a joystick configured to rotate about a first axis and a second axis, in which movement of the joystick about the first axis turns a first gear and movement of the joystick about the second axis turns a second gear; and
a rotary damper coupled to the joystick and configured to selectively resist rotation of the joystick about the first axis, the rotary damper comprising a magnetorheological (MR) damper and a first gear sleeve, the first gear sleeve surrounding at least a portion of the rotary damper and configured to engage with the first gear to couple the rotary damper to the joystick; and
a second rotary damper coupled to the joystick and configured to selectively resist rotation of the joystick about the second axis, the second rotary damper comprising a second magnetorheological (MR) damper and a second gear sleeve, the second gear sleeve surrounding at least a portion of the second rotary damper and configured to engage with the second gear to couple the secondary rotary damper to the joystick.

2. The user input device of claim 1, further comprising:
a processor in communication with the rotary damper and configured to adjust a resistance torque of the rotary damper
wherein:
based on receiving a first input, the processor is configured to operate the rotary damper in a first state, in which the rotary damper exerts a first resistance torque on the joystick while the joystick rotates about the first axis; and
based on receiving a second input, the processor is configured to operate the rotary damper in a second state, in which the rotary damper exerts a second resistance torque on the joystick while the joystick rotates about the first axis, the second resistance torque being greater than the first resistance torque.

3. The user input device of claim 2, wherein:
the processor is configured to determine a rotation angle of the joystick based on the rotation of the gear sleeve; and
based on the rotation angle being greater than a threshold, the processor is configured to operate the rotary damper in a third state, in which the rotary damper exerts a third resistance torque on the joystick while the joystick rotates about the first axis.

4. The user input device of claim 1, wherein a processor is configured to:
determine a rotation angle of the joystick about the first axis; and
based on the rotation angle, select a resistance torque of the rotary damper.

5. The user input device of claim 4, wherein the rotary damper is configured to:
exert a first resistance torque on the joystick based the rotation angle being less than a resistance threshold; and exert a second resistance torque on the joystick based the rotation angle being greater than the resistance threshold.

6. The user input device of claim 1, further comprising:
a housing defining a chamber that is configured to accommodate at least a portion of the joystick; and
a gear coupled to the housing and configured to rotate with the joystick about the first axis; and
wherein the rotary damper comprises a gear sleeve that is coupled to the gear such that rotation of the joystick about the first axis rotates the gear sleeve.

7. The user input device of claim 6, further comprising:
a platform coupled to the joystick, the platform defining an aperture; and
wherein the gear is configured to extend through the aperture to engage the gear sleeve.

8. The user input device of claim 1, further comprising:
a spring configured to apply a biasing force to the joystick such that the joystick is biased towards a center position,
wherein the rotary damper is configured to apply a resistance torque to the joystick, and
wherein the resistance torque is separate from the biasing force.

9. The user input device of claim 1, wherein:
based on receiving a third input, the processor is configured to operate the second rotary damper in a first state, in which the second rotary damper exerts a third resistance torque while the joystick rotates about the second axis; and
based on receiving a fourth input, the processor is configured to operate the second rotary damper in a second state, in which the second rotary exerts a fourth resistance torque while the joystick rotates about the second axis.

10. The user input device of claim 9, wherein the processor is configured to operate the rotary damper and the second rotary damper independently.

11. The user input device of claim 10, further comprising:
a controller casing that defines a cavity; and
a printed circuit board (PCB) disposed within the cavity,
wherein the joystick, the rotary damper, and the second rotary damper are coupled to the PCB and at least partially disposed within the cavity.

12. A joystick assembly, comprising
a joystick configured to rotate about a first axis and a second axis, in which movement of the joystick about the first axis turns a first gear and movement of the joystick about the second axis turns a second gear;
a first magnetorheological (MR) damper configured to selectively resist rotation of the joystick about the first axis, the first MR damper comprising a first gear sleeve, the first gear sleeve surrounding at least a portion of the first MR damper and configured to engage with the first gear to couple the first MR damper to the joystick; and
a second MR damper configured to selectively resist rotation of the joystick about the second axis, the second MR damper comprising a second gear sleeve, the second gear sleeve surrounding at least a portion of the second MR damper and configured to engage with the second gear to couple the second MR damper to the joystick.

13. The joystick assembly of claim 12, further comprising:
a housing defining a chamber that is configured to accommodate a portion of the joystick,
wherein the first gear is coupled to the housing,
the second gear is coupled to the housing.

14. The joystick assembly of claim 12, further comprising:
a processor in communication with the first MR damper, the processor configured to:
receive a first input; and
based on the first input, operate the first MR damper in a first state, in which the first MR damper applies a first resistance torque to the joystick.

15. A gaming system comprising:
a gaming controller configured to transmit a plurality of signals to an external device, the plurality of signals comprising user input signals, the gaming controller comprising:
a joystick configured to rotate about a first axis and a second axis based on user input, in which movement of the joystick about the first axis turns a first gear and movement of the joystick about the second axis turns a second gear;
a rotary damper configured to selectively resist rotation of the joystick about the first axis, the rotary damper comprising a magnetorheological (MR) damper and a first gear sleeve, the first gear sleeve surrounding at least a portion of the rotary damper and configured to engage with the first gear to couple the rotary damper to the joystick;
a second rotary damper coupled to the joystick and configured to selectively resist rotation of the joystick about the second axis, the second rotary damper comprising a second magnetorheological (MR) damper and a second gear sleeve, the second gear sleeve surrounding at least a portion of the second rotary damper and configured to engage with the second gear to couple the secondary rotary damper to the joystick; and
a processor configured to:
receive a first input and a second input; and
based on the first input, control the rotary damper and the second rotary damper to apply a first resistance torque and a third resistance torque; and
based on the second input, control the rotary damper and the second rotary damper to apply a second resistance torque and a fourth resistance torque;
wherein the second resistance torque is greater than the first resistance torque.

16. The gaming system of claim 15, wherein the processor is configured to receive the first input from the external device.

* * * * *